(12) United States Patent
Schulnig

(10) Patent No.: US 9,102,479 B2
(45) Date of Patent: Aug. 11, 2015

(54) GRIPPER ARM WITH INTEGRAL SPRING BAR FOR GRASPING, HOLDING AND GUIDING BOTTLE-LIKE CONTAINERS

(71) Applicant: Tyrolon-Schulnig GmbH, Hochfilzen (AT)

(72) Inventor: Elmar Ludwig Schulnig, Fieberbrunn (AT)

(73) Assignee: Tyrolon-Schulnig GmbH, Hochfilzen (AT)

( * ) Notice: Subject to any disclaimer, the term of this patent is extended or adjusted under 35 U.S.C. 154(b) by 0 days.

(21) Appl. No.: 14/184,231

(22) Filed: Feb. 19, 2014

(65) Prior Publication Data

US 2014/0232126 A1 Aug. 21, 2014

(30) Foreign Application Priority Data

Feb. 20, 2013 (EP) ..................................... 13155971

(51) Int. Cl.
*B66C 1/42* (2006.01)
*B25J 15/08* (2006.01)
*B65G 47/90* (2006.01)
*B29C 45/00* (2006.01)
*B65G 47/86* (2006.01)

(52) U.S. Cl.
CPC ............ *B65G 47/90* (2013.01); *B29C 45/0053* (2013.01); *B65G 47/847* (2013.01); *Y10T 29/49826* (2015.01)

(58) Field of Classification Search
USPC ........ 294/203, 116, 106, 110.1, 192, 198, 90; 198/803.9, 803.3, 803.7, 803.11; 425/534; 414/225.01, 226.02
See application file for complete search history.

(56) References Cited

U.S. PATENT DOCUMENTS

| | | | | |
|---|---|---|---|---|
| 5,893,700 A * | 4/1999 | Kronseder | ................. | 414/744.2 |
| 6,073,667 A * | 6/2000 | Graffin | ........................ | 141/372 |
| 6,557,695 B2 * | 5/2003 | Gerber et al. | ............. | 198/473.1 |
| 8,128,142 B2 * | 3/2012 | Glotzl | ........................ | 294/116 |

(Continued)

FOREIGN PATENT DOCUMENTS

| | | |
|---|---|---|
| DE | 19542337 A1 | 5/1997 |
| DE | 297 13 510 U1 | 10/1998 |
| DE | 29915927 U1 | 3/2000 |

(Continued)

OTHER PUBLICATIONS

European Search Report, European Application No. 13155971.8-1707, Applicant: Tyrolon-Schulnig GmbH, Date of Mailing: Sep. 9, 2013, pp. 1-5.

*Primary Examiner* — Paul T Chin
(74) *Attorney, Agent, or Firm* — Cesari and McKenna, LLP

(57) ABSTRACT

A gripper arm, and a method for its manufacture, is provided for grasping, holding and guiding objects, for example, bottle-like containers. A rotatably mounted control cam may move a gripping section of the gripper arm from an open position into a gripping position. The gripper arm may have a bore hole for supporting a bearing pin for pivotably mounting the gripper arm, a seating for an opening structure for moving the gripping section of the gripper arm from the gripping position into the open position, and a suspension structure for cushioning and equalizing the force and deflection exerted on the gripper arm by the control cam. So that the gripper arm remains sufficiently free of contaminants and germs, the suspension structure may include a spring bar integrally formed in an end section of the gripper arm body.

13 Claims, 2 Drawing Sheets

(56) References Cited

U.S. PATENT DOCUMENTS

| | | |
|---|---|---|
| 2010/0007160 A1 | 1/2010 | Glotzl |
| 2011/0109110 A1* | 5/2011 | Sarda .................. 294/99.1 |

FOREIGN PATENT DOCUMENTS

| | | |
|---|---|---|
| DE | 20 2005 002 924 U1 | 5/2006 |
| DE | 102010052348 A1 | 5/2012 |
| EP | 0939044 A1 | 9/1999 |
| EP | 1868746 B1 | 5/2009 |
| EP | 2143674 A2 | 1/2010 |
| EP | 2343255 A1 | 7/2011 |
| EP | 2548824 A1 | 1/2013 |

* cited by examiner

GRIPPER ARM WITH INTEGRAL SPRING BAR FOR GRASPING, HOLDING AND GUIDING BOTTLE-LIKE CONTAINERS

RELATED APPLICATIONS

The present application claims priority to European Patent Application No. 13155871.8, filed Feb. 20, 2013, by Elmar Ludwig Schulnig for a "Gripper for a Container", which is incorporated by reference herein in its entirety.

BACKGROUND

1. Technical Field

The present disclosure relates to a gripper arm, and a method for its manufacture, for a device for grasping, holding and guiding in particular bottle-like containers.

2. Background Information

A gripper arm is known in the prior art and is used in assembly line container processing operations. As used in the following, the term "container" refers in particular, but not solely, to bottle-like containers, thus, for example, beverage bottles made of glass or plastic. Particularly when cleaning, filling or sealing, the containers are grasped at an infeed station by a gripping device having at least one pair of gripper arms and transported to the next station in the process.

One such device is disclosed in the European EP 1 851 146 A1 patent application specification, for example. The gripping device it describes, referred to therein as a "clamp grip", is intended for a container transport system, wherein the gripping device has two gripper arms and can alternate between a gripping position and an open position. The releasing or opening process respectively of the gripping device, i.e. for alternating from the gripping position into the open position of the gripper arms, requires an opening means for the device, e.g. in the form of a coil spring or a mutually repelling pair of magnets which exerts a force on the two gripper arms and thereby opens the gripping device. The gripper arms normally have a predefined initial position into which they automatically return in the absence of any force from a control unit. As is also generally known from the prior art, the control unit is thereby realized as a mechanically acting control cam, the force of which, and thus predominantly also the deflection of the gripper arms, equalized and/or cushioned by a suspension means in the form of a leaf spring affixed to each gripper arm. The suspension means thereby aids the gripper arms in compensating for material tolerances of containers to be grasped or discrepancies in the gripping reach caused by a tilted container and thus enables a secure grip and prevents damage to containers.

However, operating such a gripping device in an environment which is not free of dust is coupled with hygienic problems, which proves disadvantageous particularly when used in hygiene-sensitive processes such as bottling beverages, juices or baby food. This is because the above-mentioned individual parts of such a known prior art gripper arm, particularly the coil spring and the leaf spring along with their respective mounting means, collect dust and/or other impurities, whereby unwanted germs can accumulate.

SUMMARY

A gripper arm, and a method for its manufacture, is disclosed which can easily be kept sufficiently free of impurities and germs. The gripper arm comprises a rotatably mounted control cam for moving a gripping section of the gripper arm from an open position into a gripping position, having a bore hole for supporting a bearing pin for pivotably mounting the gripper arm in the device, a seating for an opening means for moving the gripping section of the gripper arm from the gripping position into the open position, and a suspension means for cushioning and equalizing the force and/or deflection exerted on the gripper arm by the control cam.

The posed objective is accomplished in that the suspension means comprises a spring bar integrally formed in an end section of the gripper arm body. The separate leaf spring routinely used in conventional gripper arms is thus omitted, whereby a substantially more hygienic, one-piece configuration of the gripper arm can be achieved without contaminant-attracting cross holes. This thus goes hand in hand with considerably reducing maintenance/repair proneness, since the conventional leaf spring with its respective fittings is no longer needed as a separate component. As a result, the surfaces on which germs and contaminants can gain purchase, such as surface recesses, for example, are considerably reduced.

In a further embodiment, the opening means in the gripper arm to move the gripping section of the gripper arm from the gripping position into the open position is a magnet. The gripper arm thereby advantageously comprises a blind hole as the seating for the magnet in an anterior section between the bore hole and the gripping section, into which the magnet can be inserted during assembly of the gripper arm. Although gripper arms with magnets as the opening means are known from the above-cited prior art, they replace the coil springs likewise known from the prior art. However, affixing the magnets in the known gripper arms is relatively complex and can ensue by means of welding or screwing. Heat develops in the case of welding which in turn considerably weakens the magnetic force. Screwing, on the other hand, attracts contaminants. In contrast, the blind hole is dimensioned so as to be able to securely hold the magnets without any further mounting means. Although the blind hole can also exhibit a protruding edge or a protrusion arranged on the inner side of the blind hole which interacts with a scoring on the magnet, whereby the magnet is locked in position and prevented from falling out. The present advantageous further development of the gripper arm provides a remedy to the screw fittings known from the prior art. Since the devices at issue always employ a pair of the inventive gripper arms, it is pointed out the opposite poles of the magnets must be of the same polarity so that the two magnets will also repel to open the gripper arm pair.

The magnet is preferably encased in a plastic film. Wrapping the magnet in a plastic casing considerably reduces and/or even prevents the abrasion and/or corrosion of the magnet and any remaining attrition material collects in the plastic casing. This further development thus greatly contributes to the purity of the overall device. Furthermore, the magnet is protected from external shocks which could compromise the magnetic force.

Furthermore, the gripper arm can be advantageously manufactured from plastic as one piece. Conventional gripper arms are made of stainless steel and are thus relatively expensive, whereby metal gripper arms are occasionally known to bend during the operation of such cited apparatus, said bending on the one hand being difficult to recognize during operation of the apparatus and, on the other hand, can lead to damaging the container to be grasped and transported and/or the oppositely disposed gripper arms to which the container is transferred or which receive the container respectively, and/or other fittings. When the gripper arms are made from plastic, however, they can be injection molded very economically as disposable items. Plastic moreover exhibits better properties for this use than stainless steel in that overloading the gripper arm does not lead to bending but instead to immediate breaking, which does not entail any consequential damaging of the bottle and allows the overloaded gripper arm to be immediately recognized. Due to its one-piece design, the gripper arm can then be very quickly and economically replaced.

Fiber-reinforced polyether ether ketone (PEEK) has proven to be an advantageous plastic as it exhibits good rigidity coupled simultaneously with sufficient flexibility. PEEK is a highly temperature-resistant thermoplastic and the fiber reinforcement renders a fiber/plastic composite of high specific rigidity and firmness. Unlike conventionally used metals or stainless steel, plastic shows barely any signs of wear when cleaned with water. A gripper arm formed from plastic provides an easily replaceable product which can be disposed of without any problems after it wears out and can be replaced without great expense or long delivery times.

Furthermore having proven advantageous is for the gripping section to exhibit a tapering and/or stepped profile from the underside to the upper side of the gripper arm. Doing so thereby thus enables a better and more secure gripping of the bottle-like container at the neck of the bottle, particularly below as well as above a neck ring or collar of the neck of the bottle.

The disclosure likewise relates to a method for manufacturing an above-cited gripper arm in which a recess extending substantially in the longitudinal direction of the gripper arm is formed in the end section of the gripper arm body, its material limitation forming a spring bar on its side facing the control cam, the material strength and material properties of which enable a cushioning and equalizing of the force and/or deflection exerted by the control cam on the gripper arm, while the transverse extension of the recess limited by the spring bar provides space for the required spring deflection of the spring bar.

The advantages of this inventive method essentially follow from the details provided above on the inventive gripper arm. To be emphasized in summary is that the inventive method enables manufacturing a gripper arm which dispenses with a conventional leaf spring as a separate component and is thus able to meet substantially higher requirements as to the maintenance-free operation and the purity of a device for grasping, holding and guiding particularly bottle-like containers in which such a gripper arm is utilized.

One advantageous further development of the inventive method provides for the gripper arm to be injection molded from plastic as one piece, whereby a blind hole is formed as the seating for the magnet in an anterior section between the bore hole and the gripping section into which the magnet is inserted to complete the gripper arm. The advantages of this further development of the inventive method consist particularly in producing a mounting for the magnets which is secure and shielded from contaminants and/or corrosion and dispenses with additional components and is thus economical to manufacture as well as maintenance-free. Even just the use of plastic as the material used to manufacture the gripper arms has the advantage of reducing signs of wear and contamination compared to gripper arms formed from metal. Because plastic is used, the gripper arms can be cleaned with water as well as also with abrasive cleaning agents. Additionally, the manufacturing costs of the gripper arm can be drastically reduced when made from one piece. Just one mold or injection molding compound respectively is required in order to produce a complete gripper arm. No further parts except for the opening means inserted or fitted in the seating need to be incorporated, utilized or mounted for the gripping device with the inventive gripper arms to function.

In one previously cited method for manufacturing a gripper arm, the magnet is advantageously pressed or fit into the blind hole. The advantages of this further development of the method consist in particular of being able to produce a particularly secure, form-fit mounting for the magnets able to be manufactured in the injection molding process with low material waste.

The following will describe alternative embodiments of the gripper arm and the gripping device which differ from the previously cited embodiments essentially in the positioning and type of opening means.

In one further embodiment, preferably at least one magnet of the one gripper arm and at least one magnet of the correspondingly arranged griper arm in a gripping device are arranged at the end portion of the gripper arm and are polarized so as to attract. The advantage to this arrangement is that the anterior section does not comprise a seating for an opening means and can thus be formed shorter. Due to the shortness of the anterior section, the lever arm between the anterior section and a pivot axis of the gripper arm is shorter, whereby the anterior section can handle higher loads and hold heavier containers.

Alternatively to using two magnets, one of the gripper arms can comprise at least one magnet and the other correspondingly arranged gripper arm can comprise at least one magnetizable element. The at least one magnet of the one gripper arm and the at least one magnetizable element of the other gripper arm are thereby arranged in the end section of the gripper arms and attract. In this case, the orientation of the magnets upon their insertion into the gripper arms does not need to be additionally heeded, since, as is generally known, the magnetizable element automatically assumes the opposite magnetic polarity. All told, this alternative embodiment of the inventive gripper arms lowers the manufacturing costs even further. In addition, only one magnet can be damaged by external influences such as e.g. impacts, which is why the gripping device designed as such is easier to maintain and repair.

A spring which does not hinder the control cam operation can be incorporated alone or additionally into the end section and/or the anterior section between the gripper arms as a further opening means.

In order to furthermore improve gripper arm accessibility for cleaning, at least one part of an upper side and/or an underside of the gripper arm is inclined. Surfaces and areas of the gripper arm which are partly covered by housing elements or fixing elements when the gripper arm is installed in a gripping device are easier to reach due to their beveled surface and can be cleaned with water and/or by air jets.

BRIEF DESCRIPTION OF THE DRAWINGS

The description below refers to the accompanying drawings, of which.

DETAILED DESCRIPTION OF AN
ILLUSTRATIVE EMBODIMENT

Figure 1:
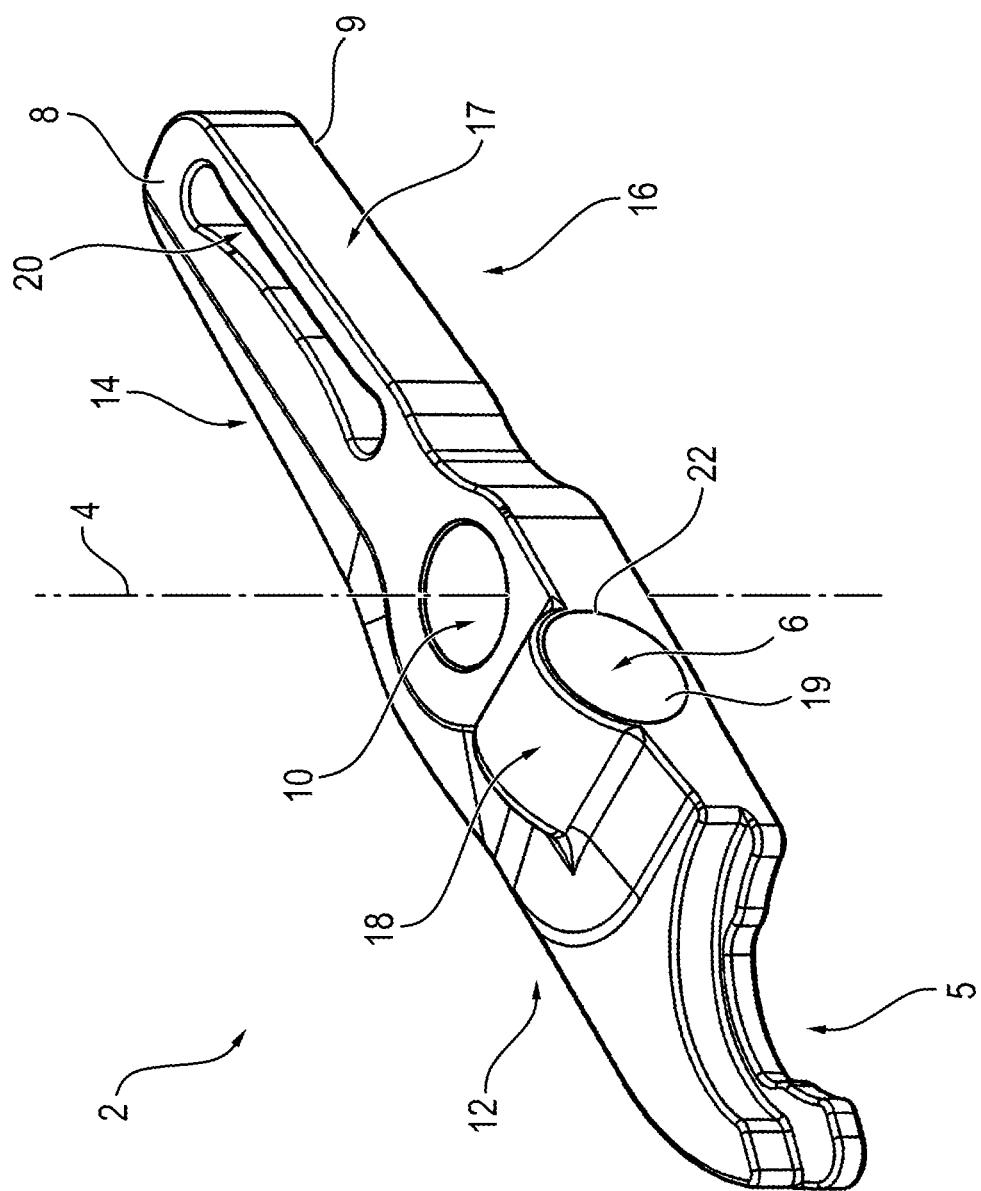
FIG. 1 is a perspective view of an inventive gripper arm of a gripping device in accordance an illustrative embodiment.

The perspective view of FIG. 1 depicts a gripper arm 2 according to an illustrative embodiment.

The gripper arm 2 is preferably of oblong shape and divided into an anterior section 12 and an end section 14. The gripper arm 2 is provided for a device for grasping, holding and guiding particularly bottle-like containers which has a (not shown in the present figure) rotatably mounted control cam for moving a gripping section 5 of the gripper arm 2 from an open position into a gripping position. A bore hole 10 is arranged between the two sections 12 and 14, or at the boundary between the two sections respectively, for supporting a (not shown in the present figure) bearing pin for pivotably mounting the gripper arm 2 in the device. A seating 18 for an opening means 6 is formed in the anterior section 12 for moving the gripping section 5 of the gripper arm 2 from the gripped position into the open position. The interaction of the gripping section 5 with a gripping section of a (not shown in the present figure) corresponding second gripper arm enables the gripping device to grip and hold a container. The container is preferentially, but not exclusively, a bottle made of PET plastic (polyethylene terephthalate) or glass and the container is grasped and held at the neck of the bottle or below the collar of the bottle. However, grasping non-bottle-like containers by for example the body of the container is also thoroughly feasible. A suspension means 16 is configured in the end section 14 for cushioning and equalizing the force and/or deflection exerted by the control cam on the gripper arm 2. The suspension means 16 thereby comprises a spring bar 17 integrally formed in an end section 14 of the gripper arm body. The spring bar 17 itself is the material boundary facing the control cam of a seating 20 formed substantially parallel to the spring bar 17 in the end section 14 of the gripper arm body which provides space for the required spring deflection of the spring bar 17.

In the embodiment depicted, the opening means 6 is a magnet 19 which can be inserted or pressed into a seating 18 formed as a blind hole 22 and arranged between the bore hole 10 and the gripping section 5 during the assembly of the gripper arm 2. The magnet 19 is cylindrical and encased in a plastic film. The gripper arm 2 is of one-piece plastic manufacture, preferably from fiber-reinforced polyether ether ketone. The gripping section 5 exhibits a tapering and stepped profile from an underside 9 to an upper side 8 of the gripper arm 2. The bore hole 10 correlates to a continuous bore from the upper side 8 to the under-side 9 of the gripper arm 2, has a circular cross section and defines a pivot axis 4 which corresponds to a symmetrical axis of the bore hole 10. The pivot axis 4 thereby extends perpendicular to the upper side 8 and underside 9. The magnet 19 is inserted into the blind hole 22 such that a surface area of the magnet 19 is flush with an outer side of the corresponding second gripper arm. One diameter of the magnet 19 is larger than the thickness of the anterior section 12, which is why the magnet 19 projects beyond a main portion of the upper side 8. Apart from the opening means 6, the gripper arm 2 can be injection molded from plastic as one piece.

Figure 2:
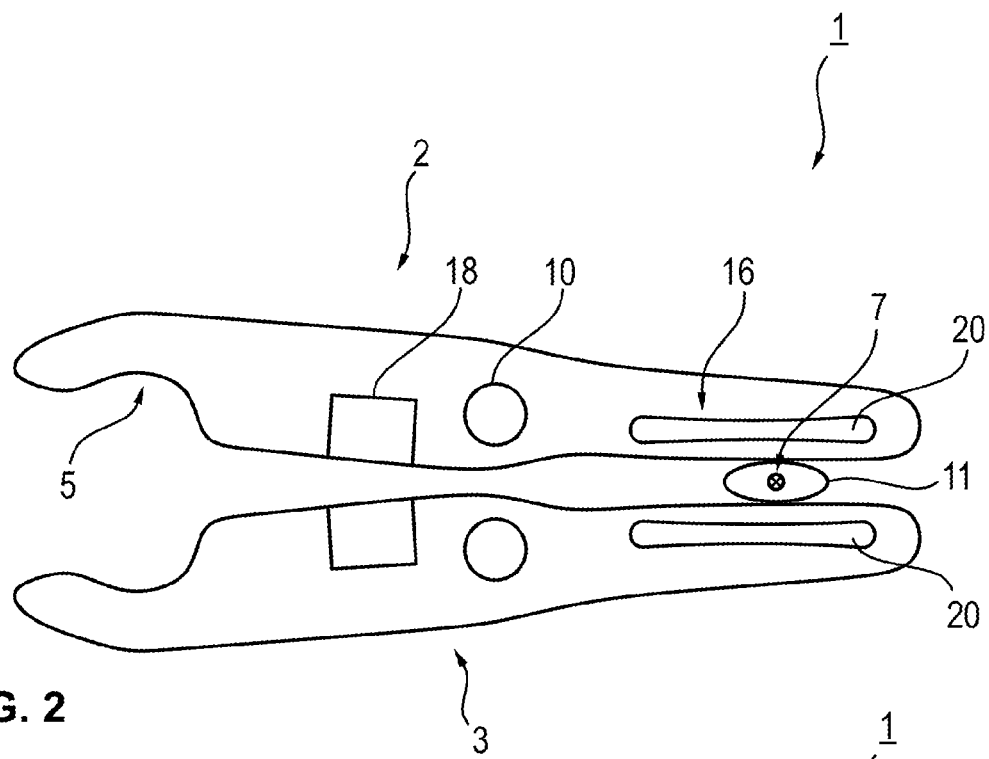
FIG. 2 is an abstract plan view of the inventive gripping device in the open position.

FIG. 2 shows an abstract plan view of a gripping device 1 comprised of two inventive gripper arms 2 and 3 in an open position.

In addition to the gripper arm 2 shown in FIG. 1, the device 1 comprises the second corresponding gripper arm 3. The two gripper arms 2 and 3 are arranged and configured symmetrically identical. The open position of the depicted gripping device 1 is characterized by a container being able to be guided between the gripping sections 5 in the anterior section 12 of the gripper arms 2 and 3, preferably from a front side of the gripping device 1. The device 1 furthermore comprises a control cam 11 arranged between the suspension means 16 of the two gripper arms 2 and 3. The control cam 11 can be rotated 360 degrees, preferably approximately 200 degrees, about a control axis 7 which preferably corresponds to its symmetrical axis. The control cam 7 thereby butts against a (not shown) limit stop. This has the advantage of the control cam 7 locking into place in an end position able to be changed by a defined opening/closing force and cannot effect a change on its own. In the open position, the control cam 11 is set such that a distance between the suspension means 16 of the two gripper arms 2 and 3 is as small as possible and preferably corresponds to the thickness of the control cam at its narrowest point.

Figure 3:
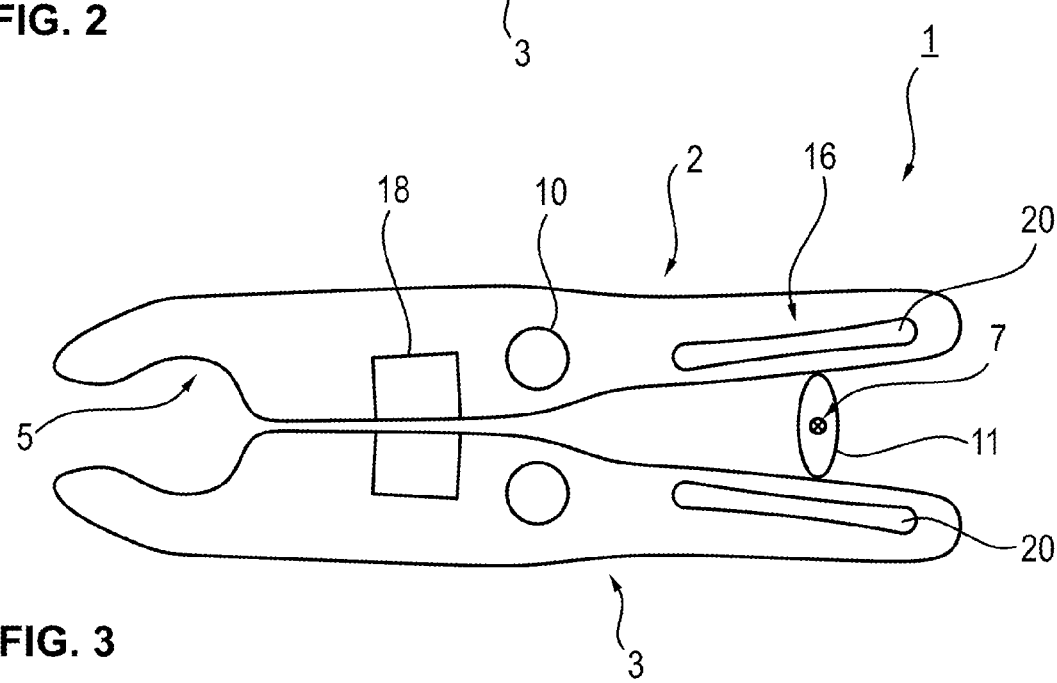
FIG. 3 is an abstract plan view of the inventive gripping device in the closed position.

FIG. 3 shows an abstract plan view of the gripping device 1 comprised of two inventive gripper arms 2 and 3 in a closed position.

The gripping device 1 corresponds to the gripping device from FIG. 2, differing only in that the control cam 11 is rotated approximately 90 degrees about control axis 7. The distance formed between the suspension means 16 of the two gripper arms 2 and 3 in the closed position is thereby enlarged and the distance between the anterior sections 12 reduced. The distance between the suspension means 16 preferably corresponds to the thickness of the control cam at its widest point. Preferentially, the suspension means 16 is not compressed in this position, even when a container is being held, so as to reduce the stress on the material of the spring bar 17. As described above, the suspension means 16 aids in compensating for uncommon material tolerances of the containers to be grasped or discrepancies in the gripping reach caused by a tilted container.

LIST OF REFERENCE NUMERALS 1 gripping device
2 gripper arm
3 corresponding gripper arm
4 pivot axis of the gripper arm
5 Gripping section
6 opening means
7 control axis
8 upper side
9 underside
10 bore hole
11 control cam
12 anterior section
14 end section
16 suspension means
17 spring bar
18 seating for opening means
19 magnet
20 recess
22 blind hole

What is claimed is:

1. A gripper arm for a device for grasping, holding and guiding bottle-like containers comprising:
    a rotatably mounted control cam for moving a gripping section of the gripper arm from an open position into a gripping position, having a bore hole for supporting a bearing pin for pivotably mounting the gripper arm in the device;
    a seating for an opening means for moving the gripping section of the gripper arm from the gripping position into the open position; and
    a suspension means for cushioning and equalizing the force or deflection exerted on the gripper arm by the control cam, wherein
    the suspension means includes a spring bar integrally formed in an end section of the gripper arm body, wherein the end section includes a recess as spring space for the spring bar and forms a material limitation of the recess on its side of the spring bar facing the control cam, the material strength and material properties of which enable a cushioning and equalizing of the force or deflection exerted by the control cam on the gripper arm.

2. The gripper arm according to claim 1, in which the opening means to move the gripping section of the gripper arm from the gripping position into the open position is a magnet, and wherein the gripper arm includes a blind hole as the seating for the magnet in an anterior section between the bore hole and the gripping section, into which the magnet can be inserted during assembly of the gripper arm.

3. The gripper arm according to claim 2, wherein the magnet is encased in a plastic film.

4. The gripper arm according to claim 1, wherein the gripper arm is manufactured from plastic as one piece.

5. The gripper arm according to claim 4, wherein the plastic is fiber-reinforced polyether ether ketone.

6. The gripper arm according to claim 1, wherein the gripping section exhibits a tapering or stepped profile from an underside to an upper side of the gripper arm.

7. The gripper arm according to claim 1, wherein the gripper is a one-piece gripper arm and the suspension means that includes the spring bar is part of the one-piece gripper arm.

8. A method for manufacturing a gripper arm comprising:
constructing a gripper arm for a device for grasping, holding and guiding bottle-like containers, the gripper arm having a rotatably mounted control cam for moving a gripping section of the gripper arm from an open position into a gripping position, and having a bore hole for supporting a bearing pin for pivotably mounting the gripper arm in the device; and
forming a recess extending substantially in a longitudinal direction of the gripper arm in an end section of the gripper arm body, the recess's material limitation forming a spring bar that is integral to the gripper arm body, the spring bar disposed on a side of the recess facing the control cam, the material strength and material properties of the spring bar to enable a cushioning and equalizing of the force or deflection exerted by the control cam on the gripper arm while the transverse extension of the recess limited by the spring bar provides space for spring deflection of the spring bar.

9. The method for manufacturing a gripper arm according to claim 8, wherein the constructing further comprises:
injection molding the gripper arm from plastic as one piece, wherein a blind hole is formed as a seating for a magnet in an anterior section between the bore hole and the gripping section into which the magnet is inserted to complete the gripper arm.

10. The method for manufacturing a gripper arm according to claim 9, further comprising:
pressing the magnet into the blind hole.

11. A method for manufacturing a gripper arm comprising:
constructing a gripper arm for a device for grasping, holding and guiding bottle-like containers, the gripper arm having a rotatably mounted control cam for moving a gripping section of the gripper arm from an open position into a gripping position, and having a bore hole for supporting a bearing pin for pivotably mounting the gripper arm in the device; and
forming a recess extending substantially in a longitudinal direction of the gripper arm in an end section of the gripper arm body, the recess's material limitation forming a spring bar that is integral to the gripper arm body, the spring bar disposed on a side of the recess facing the control cam, the material strength and material properties of the spring bar to enable a cushioning and equalizing of the force or deflection exerted by the control cam on the gripper arm while the transverse extension of the recess limited by the spring bar provides space for spring deflection of the spring bar,
wherein the gripper is a one-piece gripper arm.

12. The method for manufacturing a gripper arm according to claim 11, wherein the constructing further comprises:
injection molding the gripper arm from plastic as one piece, wherein a blind hole is formed as a seating for a magnet in an anterior section between the bore hole and the gripping section into which the magnet is inserted to complete the gripper arm.

13. The method for manufacturing a gripper arm according to claim 12, further comprising:
pressing the magnet into the blind hole.

* * * * *